J. G. RECUERO.
HYDRAULIC MOTOR.
APPLICATION FILED JUNE 30, 1919.

1,350,265.

Patented Aug. 17, 1920.
4 SHEETS—SHEET 1.

Inventor
Joseph G. Recuero
Victor J. Evans
Attorney

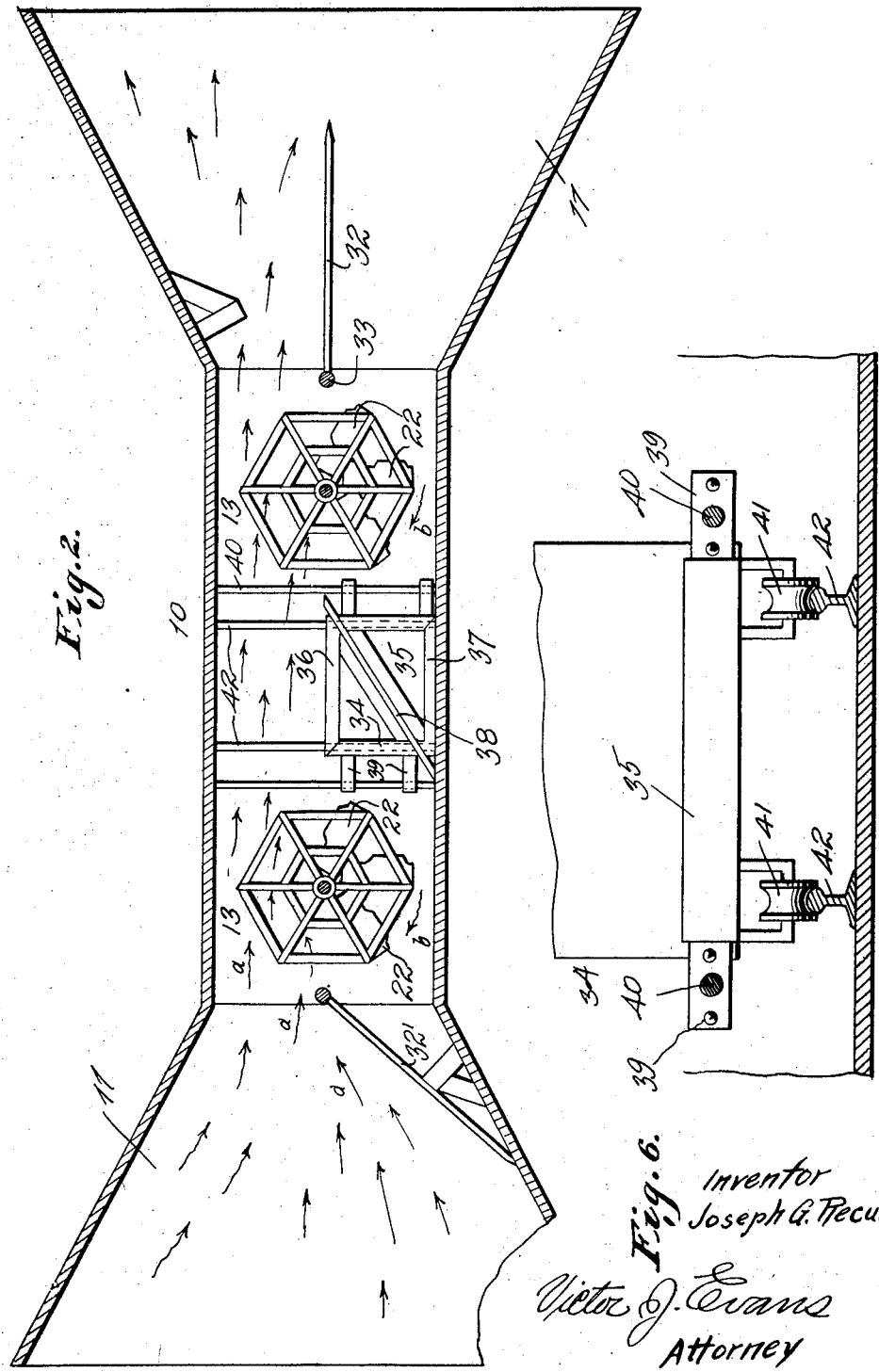

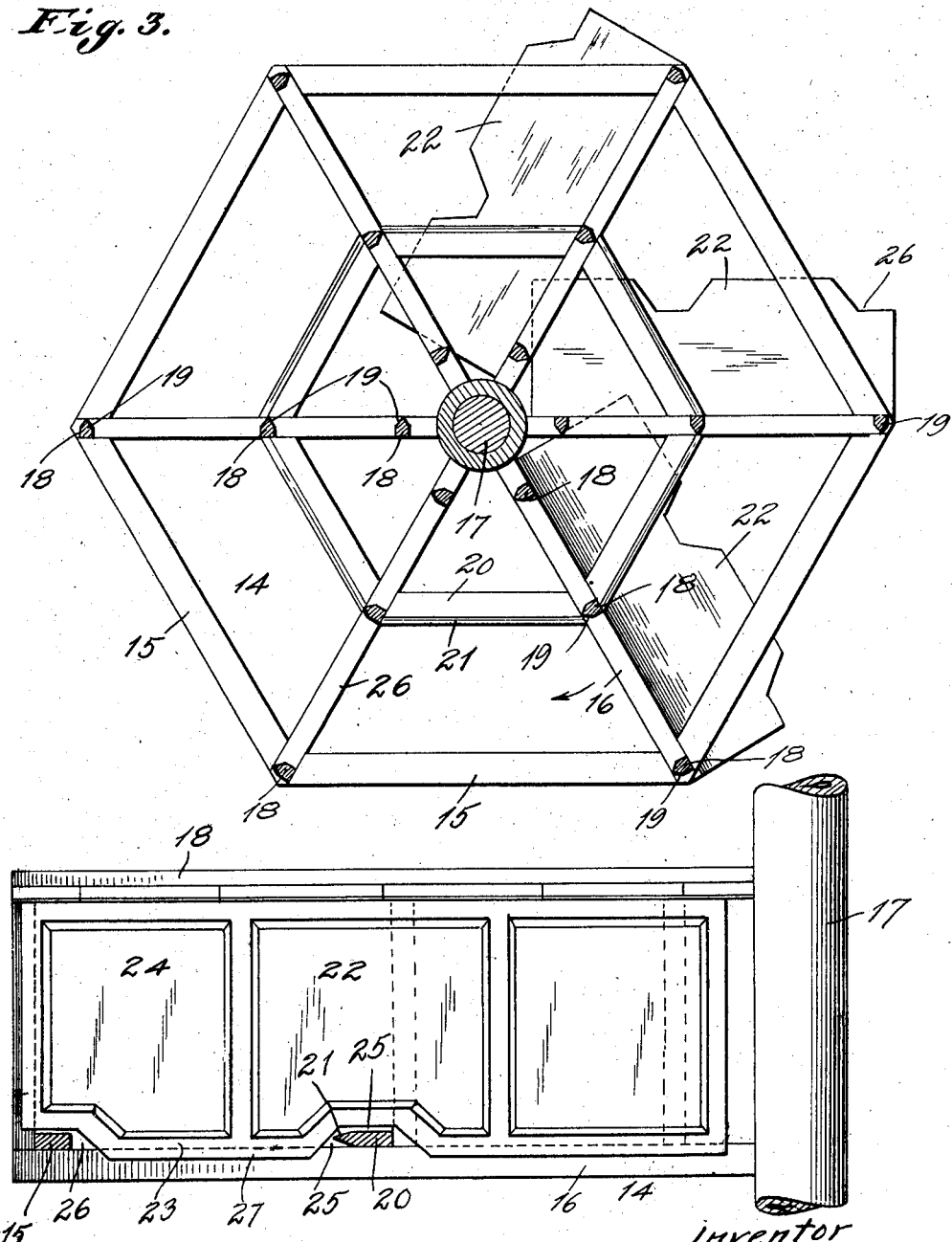

J. G. RECUERO.
HYDRAULIC MOTOR.
APPLICATION FILED JUNE 30, 1919.

1,350,265.

Patented Aug. 17, 1920.
4 SHEETS—SHEET 4.

Inventor
Joseph G. Recuero

Victor J. Evans
Attorney

UNITED STATES PATENT OFFICE.

JOSEPH GABRIEL RECUERO, OF NEW YORK, N. Y.

HYDRAULIC MOTOR.

1,350,265.   Specification of Letters Patent.   Patented Aug. 17, 1920.

Application filed June 30, 1919.   Serial No. 307,548.

*To all whom it may concern:*

Be it known that I, JOSEPH GABRIEL RECUERO, a citizen of Panama, residing at New York, in the county of New York and State of New York, have invented new and useful Improvements in Hydraulic Motors, of which the following is a specification.

This invention relates to hydraulic motors and has for its primary object the provision of a motor of this character in which the waste force of natural bodies of water such as rivers, streams or the like can be satisfactorily utilized as a driving force for the motor, the motor being of that form which will permit of its use in shallow as well as deep water.

Another object of the invention is to provide a water motor whose operation will be positive in the generation of power of high efficiency and one in which the driven element of the motor will automatically adapt or adjust itself to the change of direction in the movement of the stream so as to prevent interruption in the operation of the motor incident to low and high tide changes in the body of water in which the motor is arranged.

Another object of the invention resides in the provision of a water motor which will consist of a conduit open at both ends and adapted to be submerged in a body of water so that regardless of the direction of movement of the water the conduit will always present a working channel to cause the water to properly spend its force against the driven elements of the motor.

Another object of the invention is to provide a water motor consisting of a conduit open at both ends and provided with spaced driven elements and an intermediate deflector between said elements which operates in the manner of a valve to open the water for direct impingement against one of the driven elements after the water passes the other of said elements.

A still further object of the invention is to provide a water motor which will include rotary driven elements and devices or mechanism which will be automatically shiftable according to the direction of movement of the water and which will serve to effectively cause the water to spend its full force against said rotary driven elements.

In the drawings,

Fig. 2 is a horizontal section therethrough.

Fig. 3 is a section on an enlarged scale taken horizontally through one of the driven elements.

Fig. 4 is a side view of a portion of one of the supporting shafts showing the movable impact surface thereof.

Fig. 6 is a section through a portion of the conduit deflector.

Figure 1:
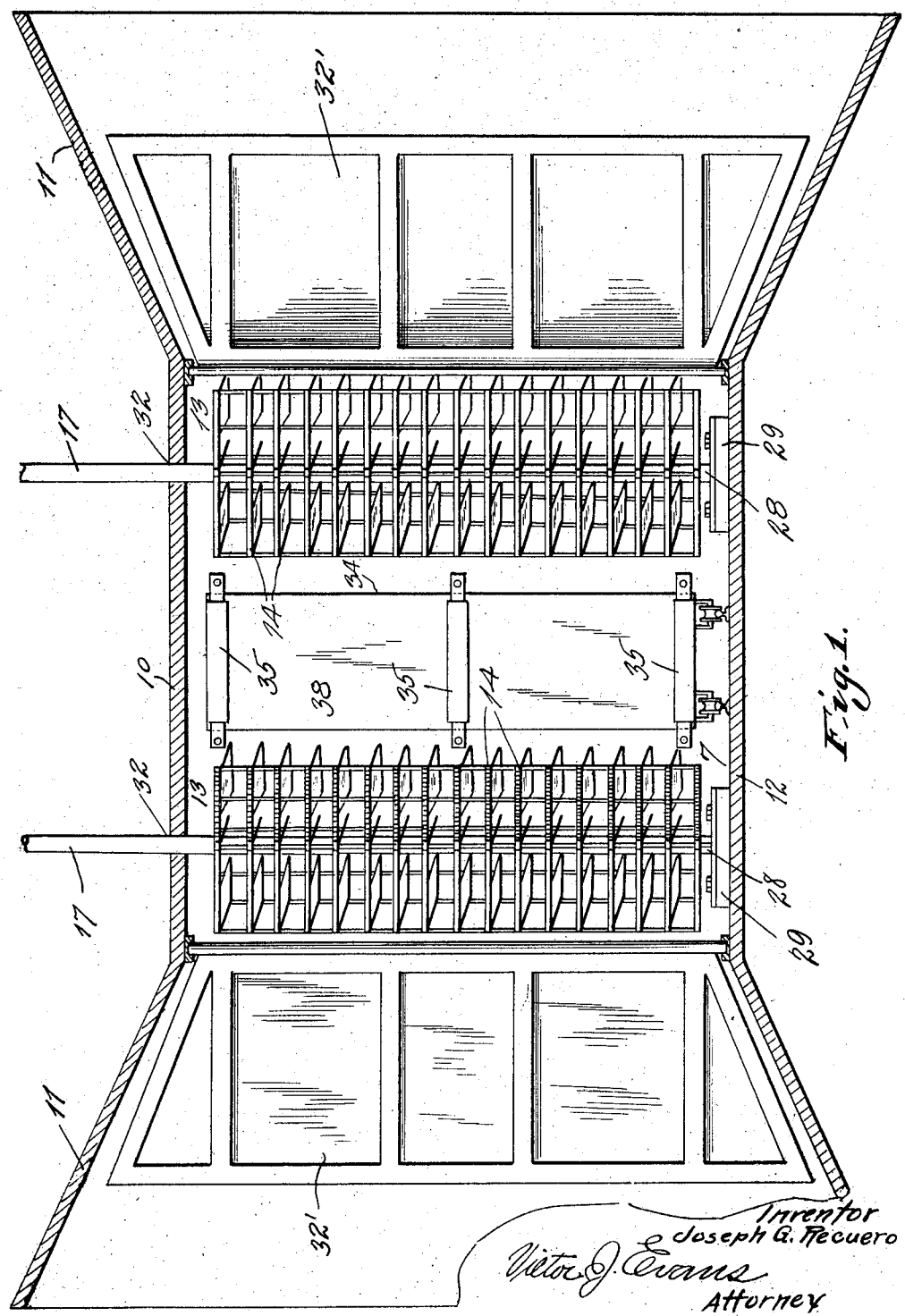
Figure 1 is a vertical longitudinal section through the motor showing parts in elevation.
Figure 7:
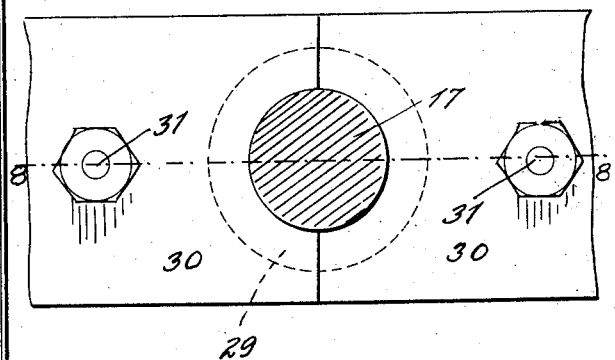
Fig. 7 is a horizontal section taken on the line 7—7 of Fig. 1.
Figure 5:
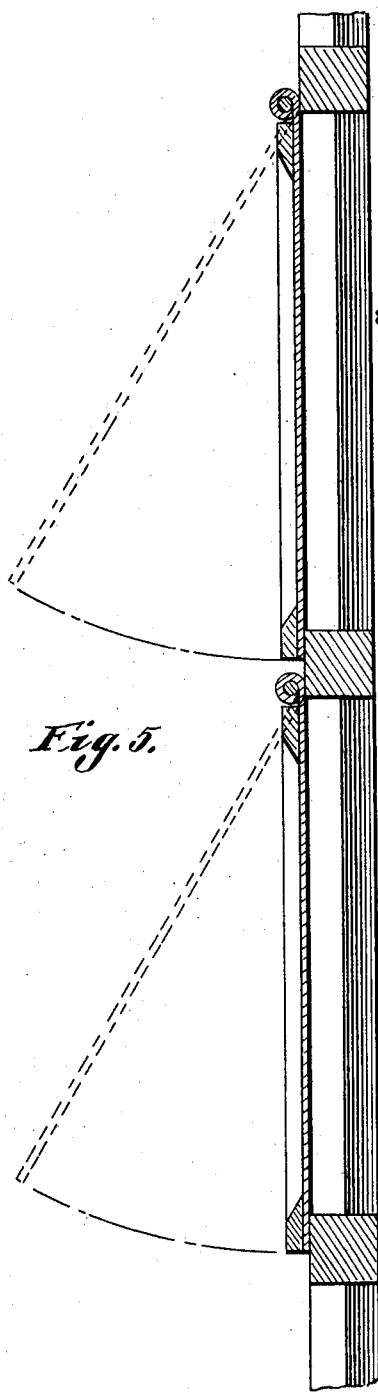
Fig. 5 is a vertical section through a portion of the frame of one of the driven elements.
Figure 8:
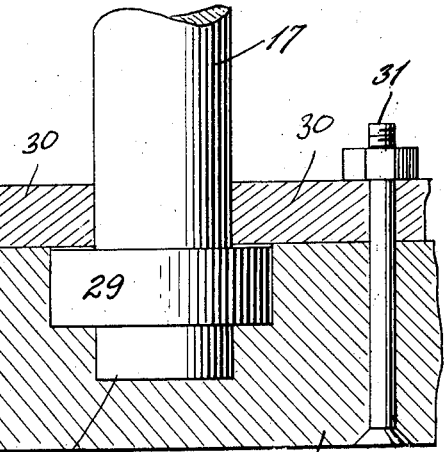
Fig. 8 is a section taken on the line 8—8 of Fig. 7.

In carrying the invention into practice use is made of a conduit 10 which is adapted to be submerged in a moving body of water such as a river, stream or the like, said conduit being open throughout its length and provided at each end with a relatively large flared mouth 11 for a purpose to be hereinafter explained. Within the intermediate section 12 of the conduit are rotary driven elements or wheels 13—13. These wheels are of identical construction and as illustrated they are preferably arranged in the same longitudinal line with each other. They are vertically disposed and each comprises a plurality of superposed frames 14. These frames may be of hexagonal or other suitable form and the outer bars 15 thereof are connected by radial bars 16 to a shaft 17. The respective frames of each of said driven elements are connected together by vertical brace bars 18, three of such bars being preferably interposed between each set of two relatively superposed radial bars 16 of said frames. These bars are provided preferably with stream line extensions 19 so as to prevent the bars from offering material resistance to the rotation of the driven elements. The bars 16 of each of said frames are also connected by intermediate horizontal brace bars 20 whose portions 21 are also of stream line effect as shown in Figs. 3 and 4. The driven elements 13 may be made up of as many superposed frames 14 as may be most suitable for the purpose. These driven elements or wheels are disposed near the ends of the intermediate section 12 of the conduit and they are equi-distantly spaced from the sides of the conduit as shown in Fig. 2. From each of the horizontal bars 18 of each frame 14 is hingedly suspended an impact gate 22 which consists of a marginal frame 23 closed at one of its sides by a metallic non-corrosive sheet 24. At the center each marginal frame 23 is recessed at 25 to accommodate the bar 20 of the next lower frame 14, while at the end, said frame 23 is recessed at 26 to accommodate the outer bar 15 of said next lower frame 14. The base portion 27 of the frame 23 is adapted to engage against the radial bar 16 of the next lower frame 14 as illustrated in Fig. 4. In this manner of constructing each one of the rotary elements or wheels 13 it will be seen that the impact gates 22 are adapted during a part of the revolution of the wheel or element to fixedly engage against said bars 16 to actively receive the force of water, while, during another portion of the revolution of the wheel or element, said impact gates are adapted to freely feather through the water so as to offer comparatively little resistance as will be understood.

The lower end of the supporting shaft 17 of each wheel or element 13 is arranged in a step bearing 28 in a support 29, the latter arranged at the bottom of the conduit 10 and as illustrated said shaft is provided with an annular collar 29 which is directly disposed beneath confining plates 30—30. These plates are secured to the support 29 by means of suitable bolts or the like 31. In this manner it is observed that the lower end of the shaft is properly held seated in said support 29, while being free for proper rotation. The shaft 17 is extended through a bearing passage 32 in the top of the conduit 10 and said shafts may be projected to suitable positions above the surface of the water in which the motor is mounted so that power from the shafts may be taken therefrom in any suitable wellknown manner.

At the juncture of the intermediate portion 12 of the conduit with the restricted ends of the mouth sections 11 are swinging deflector gates 32, the pintle 33 of each gate being disposed in the same longitudinal line with the shafts 17 of the rotary driven elements or wheels. On reference to Fig. 2 it will be observed that the gate 32 at the left of the conduit has, through the action of the inflowing water, automatically assumed a deflecting position so as to cause the water to take the course indicated by the arrows a, causing certain of the impact gates to assume relatively fixed vertical positions for the effective driving of the water thereagainst. The elements or wheels are thus revolved in the direction of the arrows b and the remaining impact gates 22 are made to automatically take the feathering positions as shown in Figs. 2 and 3.

In order that the full force of the water will be spent against each of the rotary elements or wheels 13. I provide an intermediate deflector 34 which consists of superposed frames 35 made up of sections 36 and 37 and between which is secured a vertical angularly disposed plate 38. Incident to the angularity of the plate which may be described as a line substantially at a tangent to the shafts 17 and the driven elements or wheels 13 it will be observed on reference to Fig. 2 that as the water passes from the wheel or element 13 at the left, it is operatively deflected by the plate 38 and discharged against the wheel or element 13 at the right, the discharge being preferably against one half of the wheel, while the other half is free for the previously described feathering action. The frames 35 are provided with suitable brackets 39 which are slidable on horizontal guides 40. The extreme lower frame is provided with rollers 41 which are adapted to travel upon rails 42 at the base of the conduit. Due to this construction of the intermediate deflector and further incident to the provision of the freely swinging deflector gates 32—32 it will be seen that as the direction of movement of the water changes the deflectors will automatically shift their positions whereby the wheels or elements 13—13 will be constantly driven in the same direction.

I wish to emphasize the peculiar construction of the rotary elements or wheels wherein by associating with each other a number of superposed frames 14 and suspending from the frames the described impact gates 22, the combined impact area of the gates can be nicely regulated and mathematically considered according to the amount of force desired to be created by the action of the motor. I wish also to state the advantage in the use of the radial arrangement of the impact surfaces so that at least one half of the wheel or rotary element will always be exposed for effective action of the inflowing water.

What is claimed as new is:—

1. A hydraulic motor comprising a conduit, driven wheels operatively mounted in said conduit, a shiftable deflector arranged in the conduit between the wheels, said deflector being movable at right angles to the line of movement of water passing through the conduit and serving to automatically expose one of the wheels to the active force of water passing through the conduit and to shield the remaining part of said wheel from the action of water passing through the conduit, tide actuated deflectors mounted in the conduit at points in advance of said wheels, said shiftable deflector including an under carriage, and rails mounted upon the base of the conduit for supporting said under carriage.

2. A hydraulic motor comprising a conduit, driven wheels operatively mounted in said conduit, a shiftable deflector arranged in the conduit between the wheels, said deflector being movable at right angles to the line of movement of water passing through the conduit and serving to automatically expose one of the wheels to the active force of water passing through the conduit and to shield the remaining part of said wheel from the action of water passing through the conduit, tide actuated deflectors mounted in the conduit at points in advance of said wheels, said shiftable deflector including an under carriage, rails mounted upon the base of the conduit for supporting said under carriage, brackets extending from the sides of the plate and guides carried by the conduit for slidably supporting said brackets.

In testimony whereof I have affixed my signature.

JOSEPH GABRIEL RECUERO.